C. W. COLEMAN, DEC'D.
K. COLEMAN, ADMINISTRATRIX.
SELF PROPELLED VEHICLE.
APPLICATION FILED MAY 4, 1909.
1,077,598.
Patented Nov. 4, 1913.
4 SHEETS—SHEET 1.
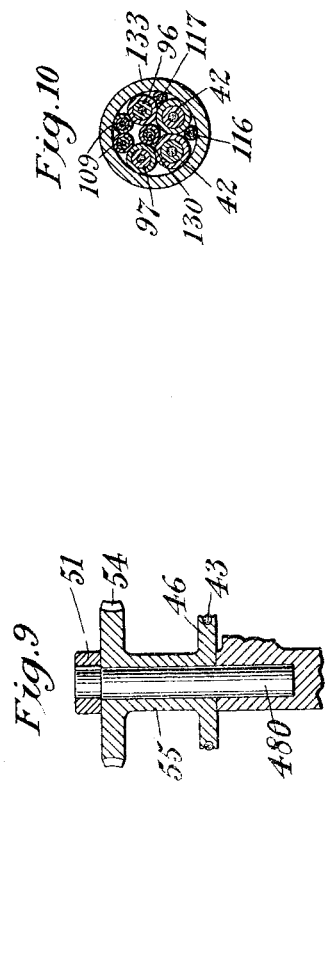
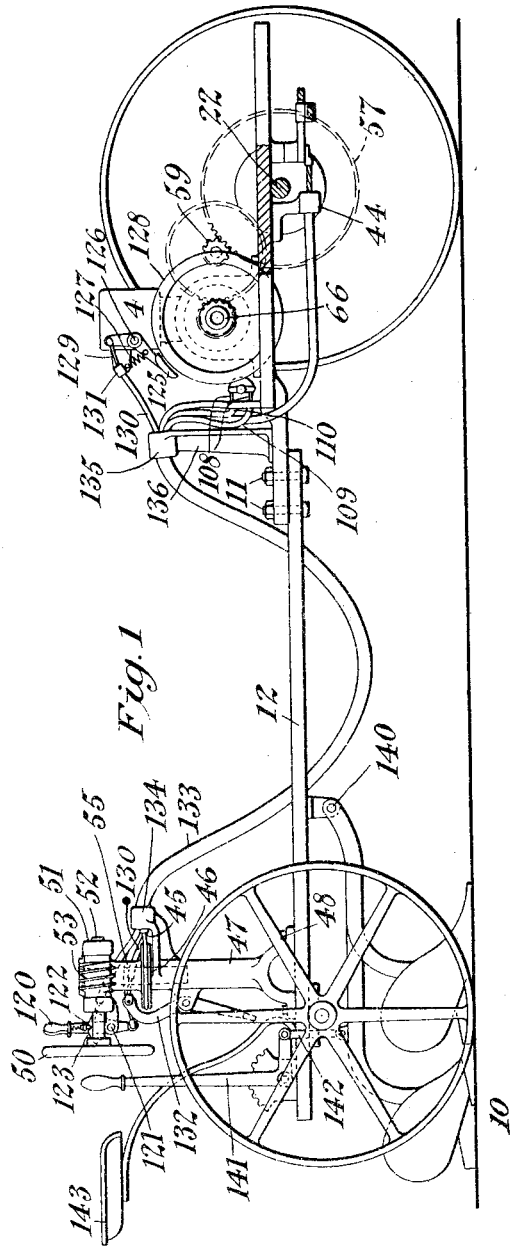

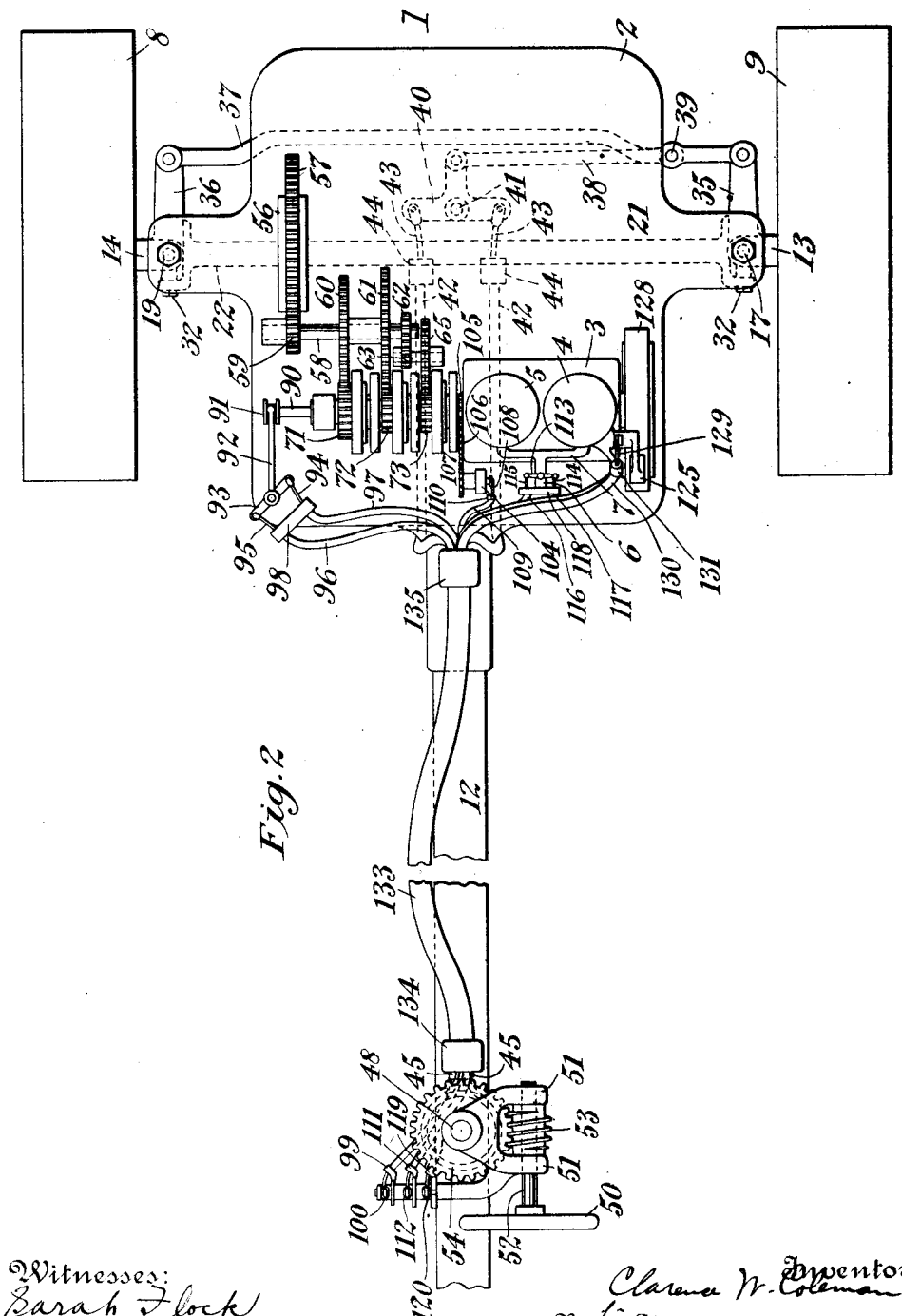

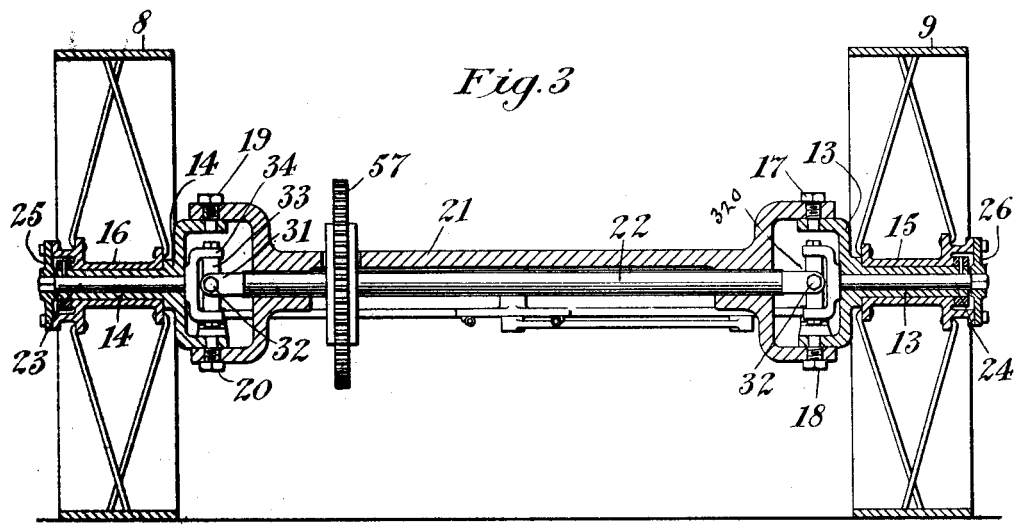
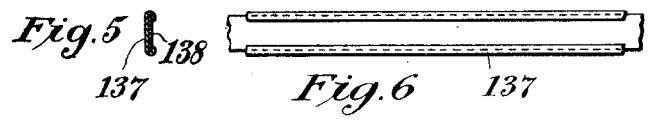

C. W. COLEMAN, DEC'D.
K. COLEMAN, ADMINISTRATRIX.
SELF PROPELLED VEHICLE.
APPLICATION FILED MAY 4, 1909.
1,077,598.
Patented Nov. 4, 1913.
4 SHEETS—SHEET 4.
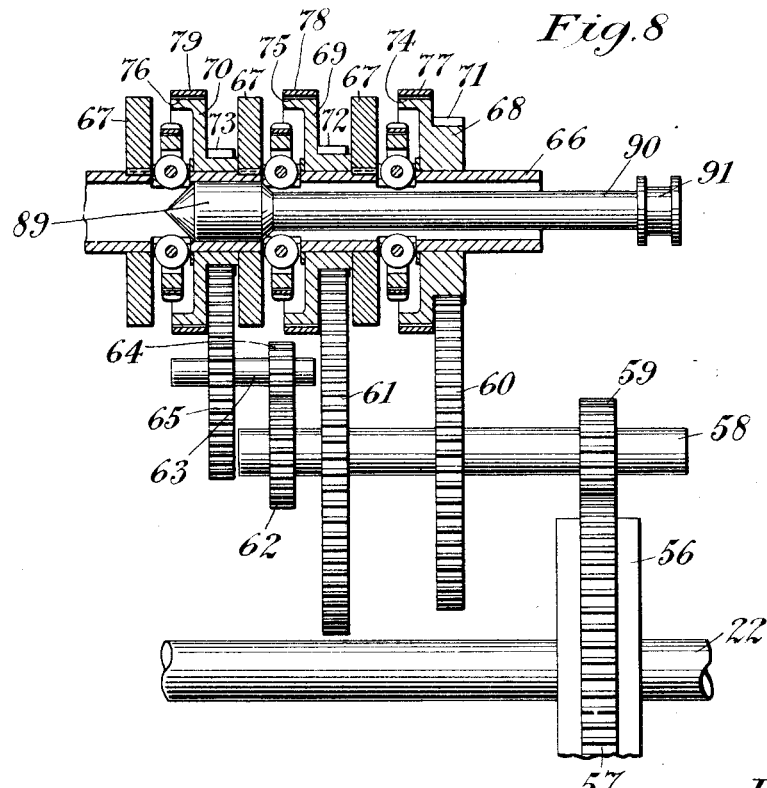
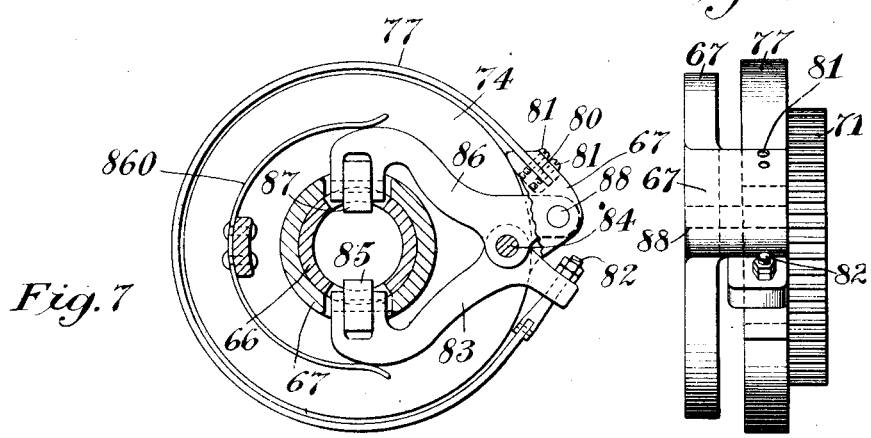
Witnesses:
Sarah Flock
C. D. King.
Inventor
Clarence W. Coleman
By his Attorney
W. J. Bissing

UNITED STATES PATENT OFFICE.

CLARENCE W. COLEMAN, OF WESTFIELD, NEW JERSEY; KATHARINE COLEMAN ADMINISTRATRIX OF SAID CLARENCE W. COLEMAN, DECEASED.

SELF-PROPELLED VEHICLE.

1,077,598.   Specification of Letters Patent.   Patented Nov. 4, 1913.

Application filed May 4, 1909. Serial No. 493,819.

*To all whom it may concern:*

Be it known that I, CLARENCE W. COLEMAN, a citizen of the United States, residing at Westfield, in the State of New Jersey, have invented a new and useful Improvement in Self-Propelled Vehicles, of which the following is a specification.

My invention relates to self propelled vehicles of the type in which an engine is mounted on a carriage and propels an apparatus which is detachably connected with the carriage, the controlling mechanism for the engine or carriage being controllable from the apparatus propelled thereby.

One of the objects of my invention is to provide a flexible, mechanical connector for steering the vehicle and one or more flexible mechanical connectors for controlling the engine, the ends of the connector being supported on the propelled apparatus and on the carriage carrying the engine respectively and the connector having sufficient slack to adapt itself to the various distances between the engine carriage and the propelled apparatus, when different kinds of apparatus are connected to the carriage.

With the above and other objects in view my invention consists of the parts, improvements and combinations more fully pointed out hereinafter.

Referring now to the drawings which are attached to the specification and form a part thereof Figure 1 is a side elevation of the traction vehicle. Fig. 2 is a plan view of the traction vehicle partly broken away at the rear end. Fig. 3 is a detail in section of part of the steering mechanism. Fig. 4 is a detail of one form of flexible connector used. Fig. 5 is a cross section of another species of flexible connector used. Fig. 6 is a detailed plan view of the second species of flexible connector used. Fig. 7 is a detail in section of part of the clutch mechanism. Fig. 8 is a detailed view, partly in section showing a clutch and driving mechanism. Fig. 9 is a sectional detail of the standard and steering wheel shown in Fig. 1. Fig. 10 is a cross section of the flexible connectors in their inclosing tube. Fig. 11 is a detail showing one of the friction clutches.

The traction vehicle comprises a carriage 1 having a floor 2 on which a suitable engine 3 is mounted. The engine is preferably a gas engine and as shown has the usual cylinders 4, 5 and is supplied with fuel through the pipe 6 and branch pipe 7 from a reservoir (not shown). The engine carriage is mounted on a pair of wheels 8, 9. The apparatus propelled by the engine may be widely varied. In the particular construction indicated it consists of an agricultural implement, viz: a plow 10. Suitable means are provided for detachably securing the plow or other implement to the engine carriage. As illustrated the bolts 11 passing through the floor 2 of the engine carriage and the reach 12 are used for this purpose. Suitable means are provided for steering the traction vehicle and particularly for steering the engine carriage, which means may be widely varied. As illustrated the wheels 8, 9 may be shifted by the steering mechanism to accomplish this result. The wheels are therefore mounted to rotate on short sleeves 13, 14, the hubs 15, 16 of the wheels, rotating on the sleeves and the sleeves being pivoted at 17, 18, 19, 20 respectively to the axle tree 21. The shaft 22 which is driven by the engine has secured to it the wheels 8, 9, the ends 23, 24 of the shaft being rigidly secured to the wheels by caps 25, 26 which fit over squared ends of the shaft. The shaft 22 is connected to the ends 23, 24 by joints 31 and 320 so as to permit shifting the wheels to guide the vehicle while they are being rotated. The joint 31 is formed by connecting the shaft 22 by pin 32 to pin 33 which terminates in bracket 34 rigidly secured to the end shaft 23. The joint 320 is correspondingly constructed.

Suitable means are provided for shifting the wheels to steer, the details of which may be widely varied. The sleeves 13, 14 have secured thereto arms 35, 36 to which links 37, 38 are connected. The links 37, 38 are pivoted together at 39 to simplify the construction. A bell crank lever 40 pivoted at 41 to the floor of the engine carriage transmits the steering movement to the links 38. In order to control the steering from the propelled apparatus and to adapt the construction to different makes and types of implements, I provide a flexible connector which in the best embodiment of the invention has sufficient slack and is large enough to adapt itself to various distances between engine and propelled apparatus. Its ends are supported by the engine carriage and propelled apparatus respectively. The kind of flexible connector may be varied. I have illustrated two species of connector in the drawings. I prefer to provide a connector having a flexible compression member, a flexible tension member, the one supported and guided by the other. The tension member slides within the compression member. In the best embodiment of the invention illustrated in Figs. 1 and 4, the compression member is a flexible, tubular member made up of a coiled spring 42 and the tension member consists of a cylindrical wire 43 passing through the compression member. A cover 44 may be used to protect the flexible connector from moisture.

The ends of the flexible connector used for steering are supported on the engine carriage and frame of the propelled vehicle respectively. Thus the compression members 42 have their ends anchored at 44 and 45 and the tension member 43 which is connected to bell crank 40 at one end passes around the drum 46 on the frame of the propelled apparatus. Suitable means are provided in the best embodiment of the invention for carrying the ends of the various flexible connectors in such a way that the entire group of ends may be readily dismounted and remounted when another vehicle or implement is to be propelled. I provide a standard 47 which is removably secured as by means of bolts 48 to the implement frame. The standard 47 carries at its upper end a socket which receives a fixed shaft 480 on which the wheel 46 is free to turn being held in place by bracket 51. Suitable means are provided for turning the wheel 46. I manually control, the steering apparatus by means of a hand wheel 50 carried by a bracket 51 secured to the standard 47, the wheel driving a shaft 52 to which is secured worm 53 engaging a worm wheel 54 secured to the wheel 46 by sleeve 55. It will be observed that by turning the hand wheel 50 the tension wire 43 passing through the compression members 42 rocks the bell crank 40 and shifts the wheels 8, 9.

Means are provided for connecting and disconnecting the engine 3 from the drive shaft 22. In the embodiment of the invention illustrated this means includes a flexible connector which controls a clutch. The drive shaft 22 has mounted thereon the usual differential gear carried in the casing 56.

A gear 57 secured to the casing 56 drives the shaft 22 through the differential. Suitable means which may be widely varied are provided for driving the gear 57. As shown a counter shaft 58 carries gears 59, 60, 61, 62 to give two speeds forward and one speed in backing, the latter movement being accomplished by gear 62 through an auxiliary shaft 63 carrying gears 64 and 65.

The means for clutching and unclutching the engine from the driven mechanism may be widely varied. As illustrated, the hollow engine shaft 66 carries disks 67 secured thereto. Gears 68, 69, 70 are freely supported on the shaft 66, so that normally the shaft turns within the gears. The gears, 68, 69, 70 have toothed portions 71, 72, 73 respectively engaging the corresponding gears 60, 61, 65. They are also provided with friction clutch surfaces 74, 75, 76 respectively with which engage clutch straps 77, 78, 79. These clutch straps have one end as at 80 secured by screws 81 to the disk 67 and have their other end secured by an adjustable take up 82 consisting of a screw and nut, to an arm 83. The arm 83 is pivoted at 84 to an arm 86 so as to form a pair of jaws, pressed inwardly by spring 860, and carries at one end a roller 85. The arm 86 likewise carries a roller 87 and is pivoted at 88 to the disk 67. As the shaft 66 rotates, carrying with it disk 67 and jaws 83 and strap 77, the latter slides freely over the clutch face of the corresponding gear 68. By sliding the plug 89 in and out, any one pair of jaws 83, 86 may be operated to clutch the corresponding gear to the engine shaft.

In accordance with the invention, I provide a flexible connector for operating the clutch from the propelled vehicle or implement. With one end of the rod 90, engaging the collar 91, the arm 92 coöperates, the arm 92 forming part of bell crank 93 actuated by tension members 94, 95 sliding within compression members 96, 97, the latter anchored at 98 to the engine frame and at 99 to the standard 47.

A hand operated lever 100 pivoted intermediate its length has secured thereto the ends of the tension members 94, 95, on opposite sides of the pivot. When the lever 100 is rocked the clutch is thrown in and out and the extent of the movement of the lever and its direction determine the particular clutch which is thrown in, which speed is used and whether the vehicle is to go backward as will be readily understood. A spring pressed pawl and fixed ratchet hold the lever 100 in position.

Suitable means which may be widely varied control the advance or retard of the sparking, in other words control the timing device. As illustrated the timer 104 is driven by gears 105, 106, 107 from the engine shaft. A flexible connector controls the timer which in the form illustrated includes a tension member 108 and compression member 109, the latter anchored at 110 and 111 to the vehicle frame. Two tension members in the form of wires 108 and two compression members in the form of guides 109 are used. A hand lever 112 supported by standard 47 actuates or sets the timing device backward or forward.

Suitable means are provided for controlling the supply of fluid to the engine. As illustrated a throttle valve is located in supply pipe 6 and is controlled by an arm 113 on the valve stem. Two tension members 114, 115 are connected to the arm and pass through compression members 116, 117 which are anchored at 118 and 119 to the vehicle frame, the latter anchor being carried by standard 47. A hand lever 120 pivoted at 121 to an arm projecting from standard 47, has secured thereto the ends of the tension members 114, 115. A spring pressed pawl 122 and fixed ratchet 123 hold the lever in position.

Suitable means are provided for applying a brake and stopping the engine and vehicle. The brake shoe 125 pivoted at 126 is pulled by spring 127 away from the fly wheel 128 of the engine and is applied by a flexible tension member 129 sliding in the flexible compression member 130 anchored at 131 to the engine frame and at the other end to the standard 47. A foot lever 132 has its upper end connected to the tension member 129, the lower end being actuated by the foot to apply the brake.

In order to simplify the construction, I surround the flexible connectors with a flexible guideway 133 secured at 134 and 135 to standards 47 and 136 respectively. The flexible connectors are preferably of different sizes according to their power as clearly shown in Fig. 10.

In the species of the members shown in Figs. 5 and 6, a trough like container 137 is used containing the slide 138. The trough and slide are flexible in one plane only and owing to their stiffness each of them can be used as both compression and tension member. The plow 10 or other implement is raised and lowered by being pivoted at 140 and by lever 141 and link 142 as will be readily understood. The seat 143 is arranged so that all the parts may be readily controlled by an operator sitting on the seat 143.

The operation of the apparatus will be readily understood from the above description. The flexible connectors form a simple, mechanical connection between the parts and by merely unbolting the standard 47 and the bolts 11, another implement or vehicle may be attached to the engine, quickly and securely.

Having thus described my invention it will be obvious that many changes may be made by the manufacturer or engineer employed to carry the invention into effect without departing from the principle of the invention.

What I claim and desire to secure by Letters Patent is:

1. The combination of a tractor vehicle having steering wheels jointed to the driving axle and mechanically connected to swing in unison, a propelling engine mounted upon said vehicle, a distinct tractor-advanced apparatus detachably connected to said vehicle and at some distance from said engine and wheels, a manually operated device carried by said apparatus, and a detachable flexible connection for transmitting manual controlling power from said device to said wheels for steering said vehicle, said connection having a length adapting it for use with a variety of tractor-advanced apparatuses.

2. The combination of a tractor vehicle having propelling wheels and a driving engine, a distinct tractor-advanced apparatus detachably connected to said vehicle, devices, borne by said vehicle for controlling the application of the engine's power, operator-actuated mechanism carried with said apparatus, and a flexible and detachable connection for mechanically transmitting power from said mechanism to said controlling devices, said connection being of sufficient length to permit its use with a variety of such tractor-advanced apparatuses.

3. The combination with a tractor vehicle having its steering wheels jointed to its driving axle to swing in unison, a propelling engine carried by said vehicle, a distinct tractor-advanced apparatus detachably connected to said vehicle, a flexible and detachable connection, for mechanically transmitting steering power from said apparatus to said wheels, of sufficient length for permitting substitution of a variety of tractor-advanced apparatuses and comprising coöperating and mutually supporting flexible tension and compression members, one of said members being anchored at its opposite ends upon said vehicle and said apparatus, respectively, and the other member being operatively connected with said wheels, to swing them, and provided at the other end with a suitable operating handle.

In testimony whereof, I have signed my name to this specification, in the presence of two subscribing witnesses.

CLARENCE W. COLEMAN.

Witnesses:
W. F. BISSING,
SARAH FLOCK.